(12) United States Patent
Koeppel et al.

(10) Patent No.: US 11,928,667 B2
(45) Date of Patent: Mar. 12, 2024

(54) SYSTEMS AND METHODS FOR MULTICOMPUTER DATA TRANSFERRING TO ACTIVATE CONTACTLESS COMMUNICATION

(71) Applicant: Capital One Services, LLC, McLean, VA (US)

(72) Inventors: Adam Koeppel, Washington, DC (US); Molly Johnson, Alexandria, VA (US); Tyler Locke, Jersey City, NJ (US); James Zarakas, Centreville, VA (US); Kevin Kelly, Austin, TX (US); Saleem Sangi, Arlington, VA (US); Robert Perry, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 15 days.

(21) Appl. No.: 17/530,224

(22) Filed: Nov. 18, 2021

(65) Prior Publication Data

US 2022/0076242 A1    Mar. 10, 2022

Related U.S. Application Data

(63) Continuation of application No. 16/168,765, filed on Oct. 23, 2018, now Pat. No. 11,210,654.

(51) Int. Cl.
*G06Q 20/34* (2012.01)
*G06F 21/35* (2013.01)
(Continued)

(52) U.S. Cl.
CPC .......... *G06Q 20/354* (2013.01); *G06F 21/35* (2013.01); *G06Q 20/322* (2013.01);
(Continued)

(58) Field of Classification Search
CPC ..... G06Q 20/00–425; H04W 4/00–90; H04W 80/00–12; G06F 21/00–88; H04L 9/00–40
See application file for complete search history.

(56) References Cited

U.S. PATENT DOCUMENTS 4,578,531 A    3/1986   Everhart
5,892,900 A    4/1999   Ginter
(Continued)

OTHER PUBLICATIONS

What is an API call_ _ Cloudflare (Year: 2023).*
(Continued)

*Primary Examiner* — John W Hayes
*Assistant Examiner* — Chenyuh Kuo
(74) *Attorney, Agent, or Firm* — KDW FIRM PLLC; Andrew D. Kasnevich

(57) ABSTRACT

The present disclosure relates to systems and methods for using multicomputer data transferring to active contactless communication. In one example, such a system may include at least one memory storing instructions and at least one processor configured to execute the instructions to perform one or more operations, the operations including: receiving a transaction associated with a merchant on a list of merchants stored in the at least one memory; determining, based on the merchant, a remote server associated with the merchant; assembling a data packet including an identifier of the contactless card and an identifier of the transaction; transmitting the data packet to the determined server across one or more computer networks; receiving confirmation from the determined sever in response to the data packet; and transmitting the confirmation to a user device associated with the transaction.

20 Claims, 8 Drawing Sheets

(51) Int. Cl.
*G06Q 20/32* (2012.01)
*G06Q 20/38* (2012.01)
*G06Q 20/40* (2012.01)
*H04W 4/80* (2018.01)
*H04W 80/00* (2009.01)
*H04L 9/08* (2006.01)

(52) U.S. Cl.
CPC ......... *G06Q 20/327* (2013.01); *G06Q 20/352* (2013.01); *G06Q 20/409* (2013.01); *H04W 4/80* (2018.02); *H04W 80/00* (2013.01); *G06Q 20/3829* (2013.01); *H04L 9/0819* (2013.01)

(56) References Cited

U.S. PATENT DOCUMENTS

| | | | | |
|---|---|---|---|---|
| 7,774,209 | B2* | 8/2010 | James | G06Q 20/3829 705/1.1 |
| 8,132,723 | B2* | 3/2012 | Hogg | G07F 7/1008 705/41 |
| 8,577,739 | B2 | 11/2013 | Loyo | |
| 8,577,803 | B2* | 11/2013 | Chatterjee | G06Q 20/326 705/41 |
| 8,844,811 | B1 | 9/2014 | Rogers | G07C 9/00904 235/382 |
| 10,636,241 | B1* | 4/2020 | Rule | G07F 7/084 |
| 10,740,746 | B2* | 8/2020 | Boivie | G06Q 20/321 |
| 11,455,606 | B2* | 9/2022 | Rule | G06Q 20/3223 |
| 2003/0028481 | A1* | 2/2003 | Flitcroft | G07F 7/122 705/39 |
| 2006/0261154 | A1* | 11/2006 | Arthur | G06Q 20/20 235/380 |
| 2007/0244831 | A1 | 10/2007 | Kuo | |
| 2010/0188975 | A1 | 7/2010 | Raleigh | |
| 2010/0235249 | A1* | 9/2010 | Smith | H04W 12/35 705/18 |
| 2012/0150669 | A1* | 6/2012 | Langley | G06Q 20/356 705/16 |
| 2012/0209749 | A1 | 8/2012 | Hammad | |
| 2014/0074637 | A1 | 3/2014 | Hammad | |
| 2014/0136346 | A1 | 5/2014 | Teso | |
| 2014/0249999 | A1 | 9/2014 | Johnson et al. | |
| 2014/0297524 | A1 | 10/2014 | Ravindranath et al. | |
| 2015/0222485 | A1 | 8/2015 | Key | |
| 2016/0012465 | A1 | 1/2016 | Sharp | |
| 2016/0071089 | A1 | 3/2016 | Boivie | |
| 2016/0307089 | A1* | 10/2016 | Wurmfeld | G06K 19/07707 |
| 2017/0161978 | A1* | 6/2017 | Wishne | G06Q 20/357 |
| 2018/0006821 | A1 | 1/2018 | Kinagi | |
| 2018/0225900 | A1* | 8/2018 | Wishne | G06Q 20/352 |

OTHER PUBLICATIONS

Juho Pesonen & Eric Horster, "Near field communication technology in tourism," Tourism Management Perspectives, vol. 4 (2012), pp. 11-18.
International Search Report and the Written Opinion of the International Searching Authority issued in related PCT Application No. PCT/US2019/057605, dated Feb. 17, 2020.
Kumar, "Design and Validation of a Digital Core for Wireless Communication with RFID-Enabled Devices" (Year: 2011).
Menezes et al., Handbook of Applied Cryptography, (Year: 1997).
Mobile Security Education with Android Labs, A Thesis presented to the Faculty of California Polytechnic State University, San Luis Obispo, Slavash Rezale, Mar. 2018 (Year: 2018).
European Examination Report issued in related European Patent Application No. EP 19804927.2, dated Jun. 26, 2023.
Office Action dated Nov. 9, 2023, in corresponding Canada Patent Application No. 3,117,330 (five (5) pages).

* cited by examiner

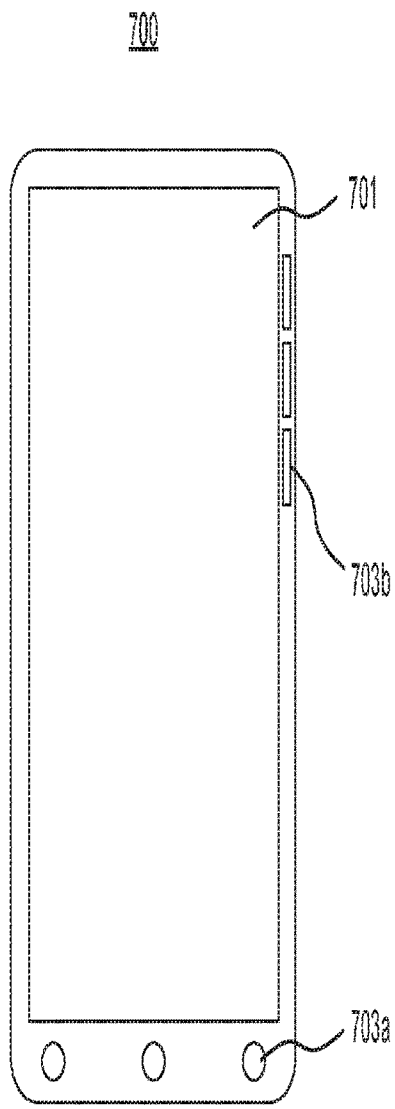
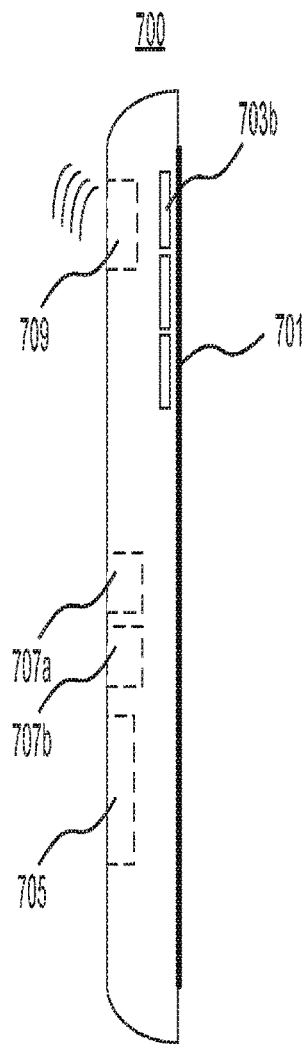
FIG. 7A
FIG. 7B

SYSTEMS AND METHODS FOR MULTICOMPUTER DATA TRANSFERRING TO ACTIVATE CONTACTLESS COMMUNICATION

CROSS-REFERENCE TO RELATED APPLICATION

This application is a continuation of U.S. patent application Ser. No. 16/168,765, filed Oct. 23, 2018, the complete disclosure of which is incorporated herein by reference.

TECHNICAL FIELD

The present disclosure relates generally to the field of multicomputer data transferring. More specifically, and without limitation, this disclosure relates to systems and methods for using multicomputer data transferring to provide contactless communication.

BACKGROUND

Contactless technologies, such as radio frequency identification (RFID), near field communication (NFC), and the like, are often used in transportation systems, hotel rooms, and other systems. However, such systems use different contactless cards or require different applications executed on mobile phones or other mobile devices to interact with different systems.

Moreover, contactless systems are often activated manually. For example, a user may use a website to activate a contactless card, may use a kiosk to activate a contactless card or mobile phone application, or may otherwise manually activate a particular card or device for use on a particular system.

SUMMARY

In view of the foregoing, embodiments of the present disclosure describe systems and methods for using multicomputer data transferring to provide contactless near-field communication.

The provided systems allow for automatic activation of a contactless card or mobile phone application in response to a transaction. Accordingly, the systems provided herein may eliminate manual steps required to activate contactless communication.

Embodiments of the present disclosure may further use multicomputer data transferring to provide portability of a contactless card or mobile phone application. In particular, systems may communicate across remote servers to active communications between readers and contactless cards or mobile phones that otherwise would not be permitted.

In one embodiment, the present disclosure describes a system for using multicomputer data transferring to activate a contactless card that may comprise at least one memory storing instructions and at least one processor configured to execute the instructions to perform one or more operations. The operations may comprise receiving a transaction associated with a merchant on a list of merchants stored in the at least one memory; determining, based on the merchant, a remote server associated with the merchant; assembling a data packet including an identifier of the contactless card and an identifier of the transaction; transmitting the data packet to the determined server across one or more computer networks; receiving confirmation from the determined sever in response to the data packet; and transmitting the confirmation to a user device associated with the transaction.

In one embodiment, the present disclosure describes a system for using multicomputer data transferring to activate a contactless mobile device that may comprise at least one memory storing instructions and at least one processor configured to execute the instructions to perform one or more operations. The operations may comprise receiving a transaction associated with a merchant on a list of merchants stored in the at least one memory; determining, based on the merchant, a remote server associated with the merchant; assembling a data packet including an identifier of the contactless mobile device and an identifier of the transaction; transmitting the data packet to the determined server across one or more computer networks; receiving confirmation from the determined sever in response to the data packet; receiving an access code from the determined server configured to authorize the contactless mobile device to access a contactless network associated with the merchant; and transmitting the confirmation and the access code to the contactless mobile device. The contactless mobile device may be configured to transmit the access code to a contactless reader of the contactless network.

In one embodiment, the present disclosure describes a system for using multicomputer data transferring to activate contactless access that may comprise at least one memory storing instructions and at least one processor configured to execute the instructions to perform one or more operations. The operations may comprise receiving, from a remote server, an identifier of a transaction and an identifier of a contactless device; retrieving a period of time associated with the transaction; verifying that the contactless device is associated with the transaction; transmitting a command to one or more remote readers to authorize the contactless device during the period of time; and transmitting confirmation to the remote server.

In one embodiment, the present disclosure describes a contactless card for use across a plurality of computing systems. The card may comprise at least one coil configured to transduce at least one radio frequency signal and at least one circuit configured to set a content of the at least one radio frequency signal in response to a control signal. The control signal may be configured to set the content to an access code provided by a remote server, where the access code is associated with a period of time associated with a transaction.

In one embodiment, the present disclosure describes a contactless mobile device for use across a plurality of computing systems. The mobile device may comprise at least one antenna configured to transduce at least one radio frequency signal, at least one microprocessor configured to set a content of the at least one radio frequency signal in response to a control signal, and at least one battery powering the at least one microprocessor. The control signal may be configured to set the content to an access code provided by a remote server, where the access code is associated with a period of time associated with a transaction.

In one embodiment, the present disclosure describes a contactless reader for accepting contactless devices managed by a plurality of computing systems. The reader may comprise at least one coil configured to transmit an interrogation signal and receive a response signal and at least one processor configured to verify the response signal against an access code provided by a remote server, where the access code is associated with a period of time associated with a transaction.

In some embodiments, the present disclose describes non-transitory, computer-readable media for causing one or more processors to execute methods consistent with the present disclosure.

It is to be understood that the foregoing general description and the following detailed description are example and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings:

FIG. 7A is a block diagram of an example contactless mobile device with which the systems, methods, and apparatuses of the present disclosure may be implemented.

FIG. 7B is a side view of the example user device of FIG. 7A.

DETAILED DESCRIPTION

The disclosed embodiments relate to systems and methods for backing up a distributed database on a cloud service that provide the distributed database within a geographical region. Embodiments of the present disclosure may be implemented using a general-purpose computer. Alternatively, a special-purpose computer may be built according to embodiments of the present disclosure using suitable logic elements.

Advantageously, disclosed embodiments may solve the technical problem of porting a contactless device, such as a card or a mobile phone, across a plurality of contactless systems. Moreover, disclosed embodiments may solve the technical problem of automating the previously manual process of activating contactless devices when necessary. Therefore, the disclosed embodiments enable a single contactless device to seamlessly and automatically port across multiple contactless systems and in different situations (such as in a transit system, a hotel, or the like) in response to authorization of a transaction related to said contactless system.

Figure 1:
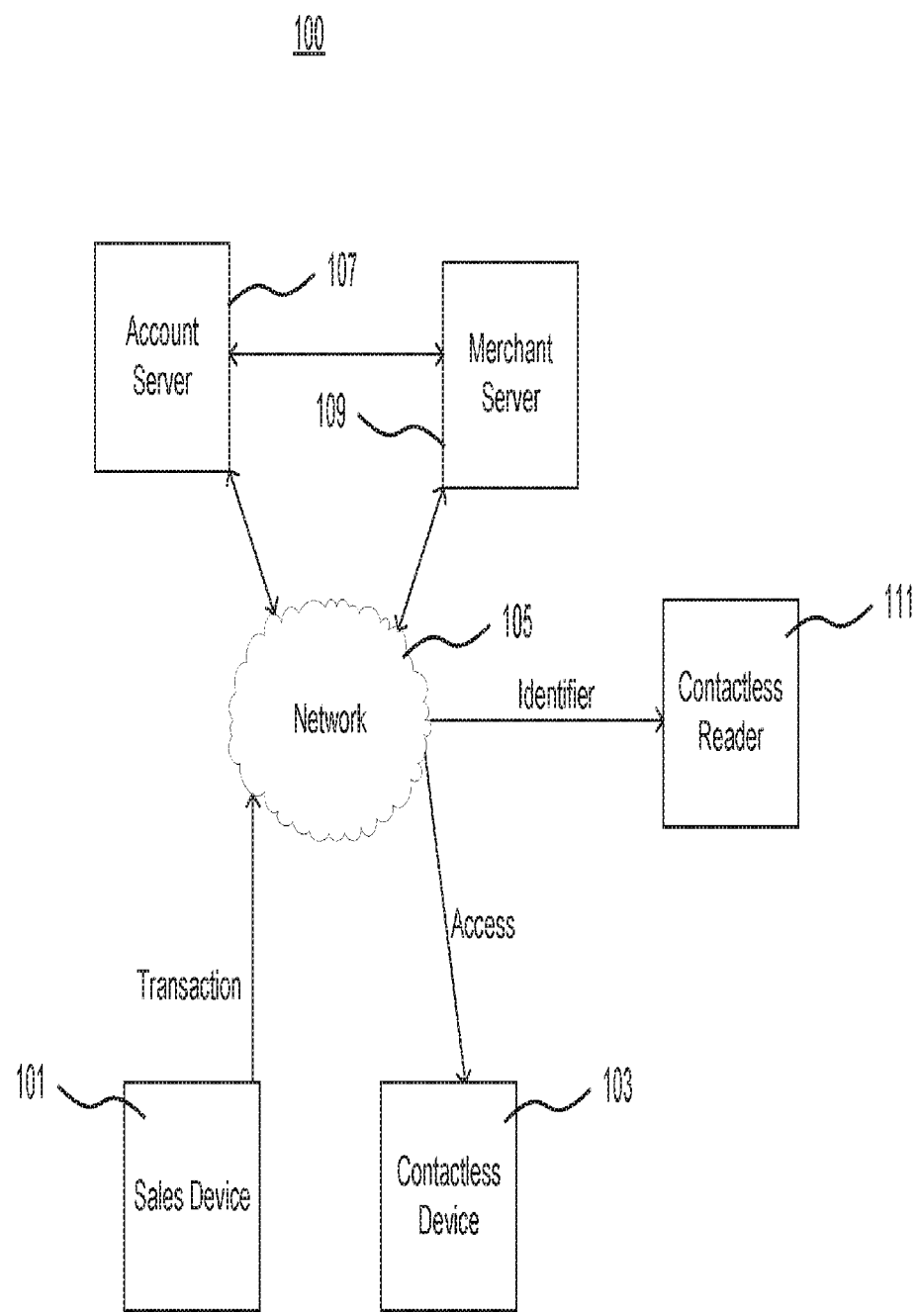
FIG. 1 is a block diagram of a system including a contactless device and reader with a remote server, according to an example embodiment of the present disclosure.

FIG. 1 depicts a block diagram of a system 100 for using multicomputer data transferring to activate a contactless device. As illustrated in FIG. 1, system 100 may include a device 101 that sends a transaction through network 105 to account server 107. Network 105 may comprise an open loop network (e.g., the Internet, a cellular network, or the like) or a closed loop network (e.g., an intranet, leased link network, or the like). For example, device 101 may comprise a point of sale system, a website, or any other device sending a transaction for approval. Account server 107 may comprise a server associated with a financial institution or other server storing account records. Account server 107 may authorize the transaction. Although depicted as received directly from device 101, the transaction may be received from a payment processor forwarding the transaction from device 101 to account server 107.

As further depicted in FIG. 1, system 100 may include a merchant server 109 that sends an access code through network 105 to contactless device 103. Contactless device 103 may comprise a mobile device (e.g., device 700 of FIGS. 7A and 7B) or a card (e.g., card 800 of FIG. 8). For example, the access code may be transmitted by contactless device 103 to authorize it for use in contactless reader 111. Alternatively, merchant server 109 may transmit the access code to account server 107 for transmission to contactless device 103.

In some embodiments, contactless device 103 may include a fixed identifier or access code rather than re-configuring in response to a transmission from merchant server 109 or any other external device. Accordingly, merchant server 109 may configure contactless reader 111, as explained below, such that contactless device 103 is recognized and authorized by contactless reader 111 without any transmission being sent to contactless device 103.

As further depicted in FIG. 1, merchant server 109 may transmit an identifier of contactless device 103 through network 105 to contactless reader device 111. Contactless reader 111 may comprise a kiosk, an RFID reader, or other device including at least one coil to transmit radio signals at a frequency (e.g., determined by RFID standards, NFC standards, Bluetooth standards, or the like) and/or receive radio signals from contactless device 103. In addition to the at least one coil, contactless reader 111 may include a microprocessor, a processor, or other circuit controlling intensity, timing, and/or other properties of the radio signals transmitted by the at least one coil and may include a network interface controller or other network communicator to send and receive data to and from a remote server in the same contactless network as reader 111.

In some embodiments, the identifier may comprise a serial number of contactless device 103, a serial number of a component of contactless device 103 (such as a transponder, a printed circuit board, or other component of contactless device 103), a machine name associated with contactless device 103, or the like. Contactless reader 111 may thus respond to contactless device 103. In some embodiments, merchant server 109 may additionally or alternatively transmit the access code to contactless reader 111. Accordingly, if contactless device 103 transmits the access code to contactless reader 111, contactless reader 111 may respond accordingly, e.g., by allowing access to a corresponding transit system, hotel room, or the like.

In some embodiments, the access code may be associated with a period of time. Accordingly, contactless device 103 may be authorized to communicate with contactless reader 111 only during the period of time. For example, the access code may be associated with a flight reservation such that contactless reader 111 accepts the access code only during boarding of the flight. In another example, the access code may be associated with a hotel reservation such that contactless reader 111 accepts the access code only during the reservation.

Additionally or alternatively, the access code may be associated with a number of uses. Accordingly, contactless device 103 may be authorized to communicate with contactless reader 111 for a predetermined number of times. For example, the access code may be associated with an amusement park such that contactless reader 111 accepts the access code for a number of rides that have been purchased and then rejects further uses. In another example, the access code may be associated with.

Additionally or alternatively, contactless device 103 may be authorized for the period of time and/or for the number of uses without receiving an access code. For example, as described above, contactless reader 111 may receive instructions to authorize contactless device 103 for the period of time and/or for the number of uses without requiring contactless device 103 to produce an access code.

Account server 107 may comprise one or more servers operated by an institution authorizing the transaction, and merchant server 109 may comprise one or more servers operated by an operator of the contactless network including contactless reader 111. Additionally or alternatively, merchant server 109 may comprise one or more servers operated by a third party managing the contactless network associated with the merchant.

Account server 107 and merchant server 109 may use multicomputer data transferring such that contactless device 103 is authorized automatically when the transaction is authorized. For example, account server 107 may determine an associated merchant based on the transaction to determine merchant server 109 for receipt of a data packet, e.g., using a database linking merchants to server locations (e.g., Internet Protocol (IP) addresses or the like).

Account server 107 may send a data packet (e.g., an application programming interface (API) call) to merchant server 109 in response to the transaction. For example, account server 107 may determine that the transaction is associated with a merchant having a contactless network, such as a hotel, an airline, a transit system, or the like. Accordingly, account server 107 may send a data packet to authorize contactless device 103 to interact with contactless reader 111 of the contactless network. By using multicomputer data transferring accordingly, account server 107 may allow a user to port contactless device 103 to different contactless networks and to port contactless device 103 automatically in response to a transaction.

Figure 2:
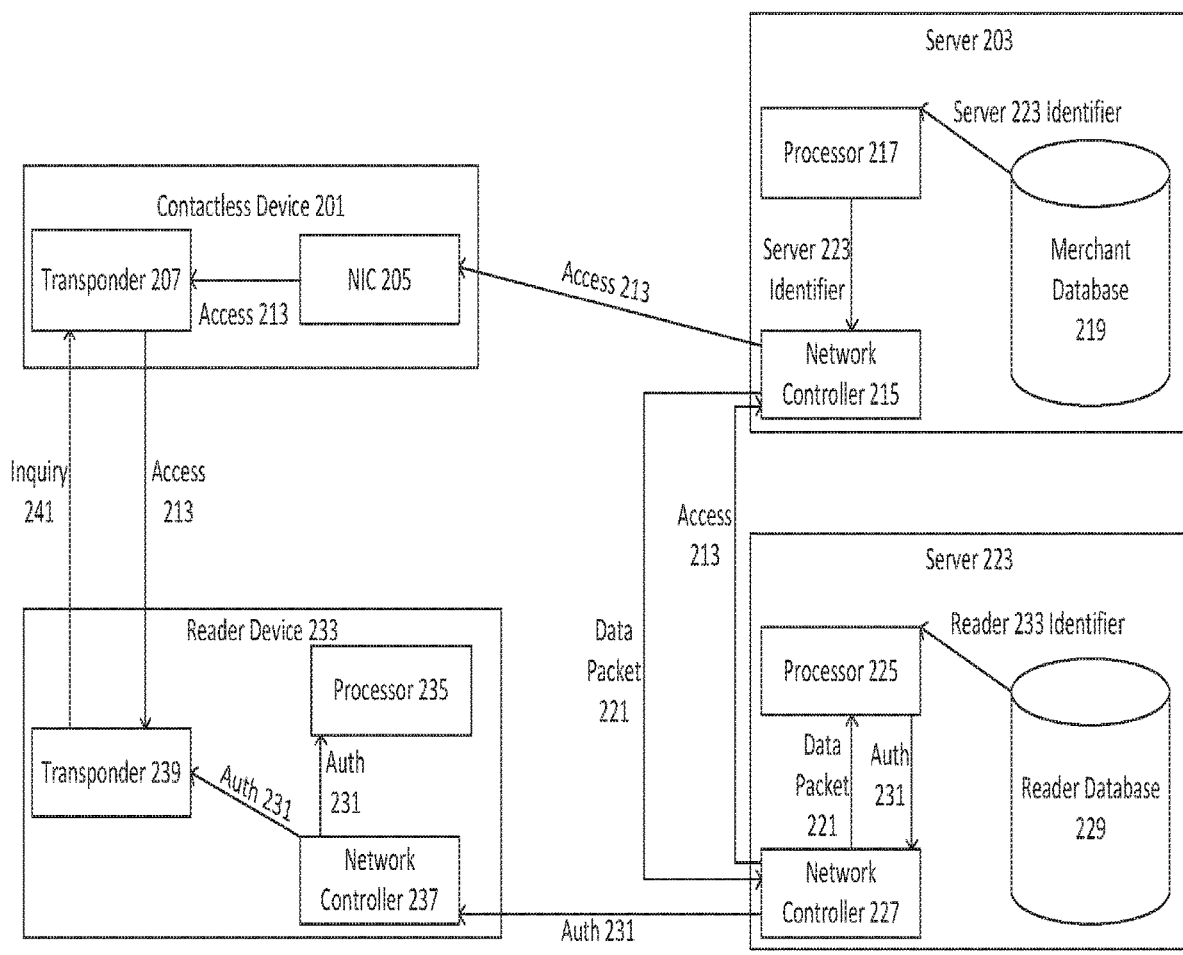
FIG. 2 is a block diagram of a multicomputer exchange between two servers to authorize contactless access, according to an example embodiment of the present disclosure.

FIG. 2 shows a block diagram of a multicomputer exchange 200 between two servers to authorize a contactless device. For example, exchange 200 may be effected using method 300 of FIG. 3, method 400 of FIG. 4, or a combination thereof. One of ordinary skill will understand that the arrangement of FIG. 2 is exemplary; other arrangements may be used to perform the same functions as described herein. Contactless device 201 may comprise, for example, user device 700 of FIGS. 7A and 7B or card 800 of FIG. 8. Similarly, servers 203 and 223 may comprise account servers 107 and merchant server 109, respectively, of FIG. 1.

As depicted in FIG. 2, contactless device 201 may include a transponder 207 and a wireless communications device, e.g., network interface controller (NIC) 205. Correspondingly, reader device 233 may include a transponder 239, a processor 235, and a network controller 237. Accordingly, transponder 207 may communicate with transponder 239 using radio signals, e.g., using RFID protocols, NFC protocols, or the like.

As further depicted in FIG. 2, processor 217 of server 203 may, in response to a transaction, retrieve an identifier of server 223 from merchant database 219. Merchant database 219 may map merchants (e.g., included in the transaction) to locations of servers associated with the merchants (e.g., IP addresses, machine names, or the like). Accordingly, merchant database 219 may comprise a relational database or the like.

Server 203 may use network controller 215 to transmit database packet 221 to server 223, which was identified based on merchant database 219. Data packet 221 may comprise an API call to server 223, as explained above with respect to FIG. 1.

In response to receiving data packet 221 using network controller 227, server 223 may retrieve an identifier of one or more contactless readers, e.g., reader device 233, using reader database 229. Reader database 229 may map properties of a transaction (e.g., identifier of a reserved room, identifier of a portion of a transit system, or the like) to corresponding locations of one or more contactless readers (e.g., IP addresses, machine names, or the like). Accordingly, reader database 229 may comprise a relational database or the like.

Server 223 may transmit an authorization 231 to reader device 233 and an access code 213 back to server 203 for transmission to contactless device 201. Alternatively, server 223 may transmit access code 213 directly to contactless device 201. Access code 213 may be transmitted by contactless device 201 to reader device 233 in order to authorize contactless device 201. As explained above with respect to FIG. 1, access code 213 may grant a limited time access to contactless device 201. Authorization 231 may comprise an identifier of contactless device 201, a corresponding code to access code 213, or other data by which reader device 233 may verify contactless device 201.

As further depicted in FIG. 2, contactless device 201 may transmit access code 213 to reader device 233 such that contactless device 201 is granted access to at least a portion of a contactless network (e.g., a transit system, a hotel room, or the like) associated with reader device 233. In the example of FIG. 1, contactless device 201 transmits access code 213 in response to an inquiry 241 from reader device 233. Alternatively, contactless device 201 may transmit access code 213 in response to user input to contactless device 201. In an alternative example, reader device 233 may transmit inquiry 241 and contactless device 201 may transmit an identifier of itself in response. Reader device 233 may therefore verify contactless device 201 using authorization 231 and the identifier of contactless device 201.

Figure 3:
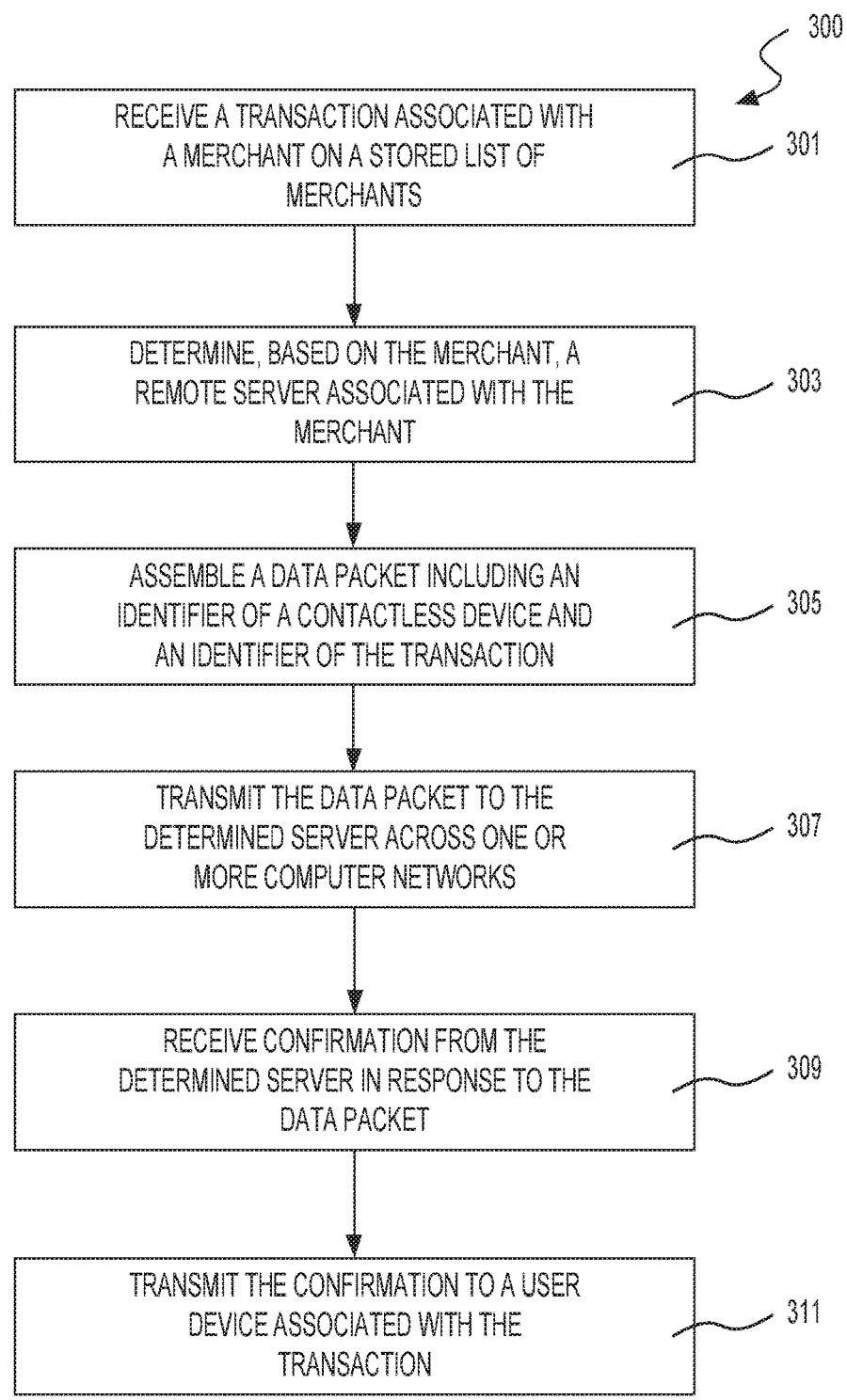
FIG. 3 is a flowchart of an example method for multicomputer data transferring to activate a contactless card, according to an example embodiment of the present disclosure.

FIG. 3 depicts an example method 300 for using multicomputer data transferring to activate a contactless device. Method 300 may be implemented using one or more processors (e.g., processor 601 of FIG. 6).

At step 301, the processor may receive a transaction associated with a merchant on a list of merchants stored in the at least one memory. For example, as explained above with respect to FIG. 1, the processor may receive the transaction from a point of sale device, a website, or the like. In some embodiments, as explained above with respect to FIG. 2, the list of merchants may comprise a database linking merchant identifiers to identifiers of remote servers associated with merchants.

At step 303, the processor may determine, based on the merchant, a remote server (e.g., server 109 of FIG. 1)

associated with the merchant. For example, the processor may use the database to determine an IP address, machine name, or other identifier of the remote server associated with the merchant.

At step 305, the processor may assemble a data packet including an identifier of the contactless device and an identifier of the transaction. For example, the data packet may comprise an application programming interface (API) call to an application executed by the determined server.

The identifier of the contactless mobile device may comprise at least one of a serial number of a component of the contactless mobile device, or a universally unique identifier (UUID) associated with the contactless mobile device. Additionally or alternatively, the identifier of the transaction may comprise at least one of an identifier generated by the at least one processor, an identifier generated by the merchant, or a reservation number associated with the transaction.

At step 307, the processor may transmit the data packet to the determined server across one or more computer networks. For example, the processor may use Wi-Fi, a 4G, a long-term evolution (LTE), or other protocol across a local area network (LAN), the Internet, or other computer network.

At step 309, the processor may receive confirmation from the determined sever (e.g., server 109 of FIG. 1) in response to the data packet. For example, the confirmation may comprise confirmation that the determined server authorized the contactless device.

At step 311, the processor may transmit the confirmation to a user device (e.g., sale device 101 and/or contactless device 103 of FIG. 1) associated with the transaction. For example, the confirmation may comprise a push alert or other message to the user device indicating that the determined server authorized the contactless device.

In embodiments where the contactless device comprises a contactless mobile device, the processor may transmit the confirmation to the contactless mobile device. In such embodiments, transmitting the confirmation may comprise transmitting an application programming interface (API) call to an application executed by the contactless mobile device. The API call may be configured to modify one or more settings of the contactless mobile device. The modified settings may be configured to authorize the contactless mobile device to communicate with one or more reader devices associated with the merchant.

Method 300 may further include additional steps. For example, method 300 may further include transmitting credentials to the determined server. In some embodiment, the credentials may comprise credentials associated with a purchaser of the transaction or an authorization previously provided from the determined server.

In some embodiments, the processor may be prompted for the credentials. For example, the processor may receive a request for credentials from the determined server and, in response to the request, transmit credentials to determined server to authenticate the system.

In any of the embodiments described above, the processor may receive an access code from the determined server and transmit the access code to the contactless device. For example, the processor may transmit the access code across one or more computer networks to a contactless mobile device. In another example, the processor may transmit the access code across one or more computer networks to the user device associated with the transaction. The user device may then forward the access code to the contactless device, such as a contactless card associated with the user device.

Figure 4:
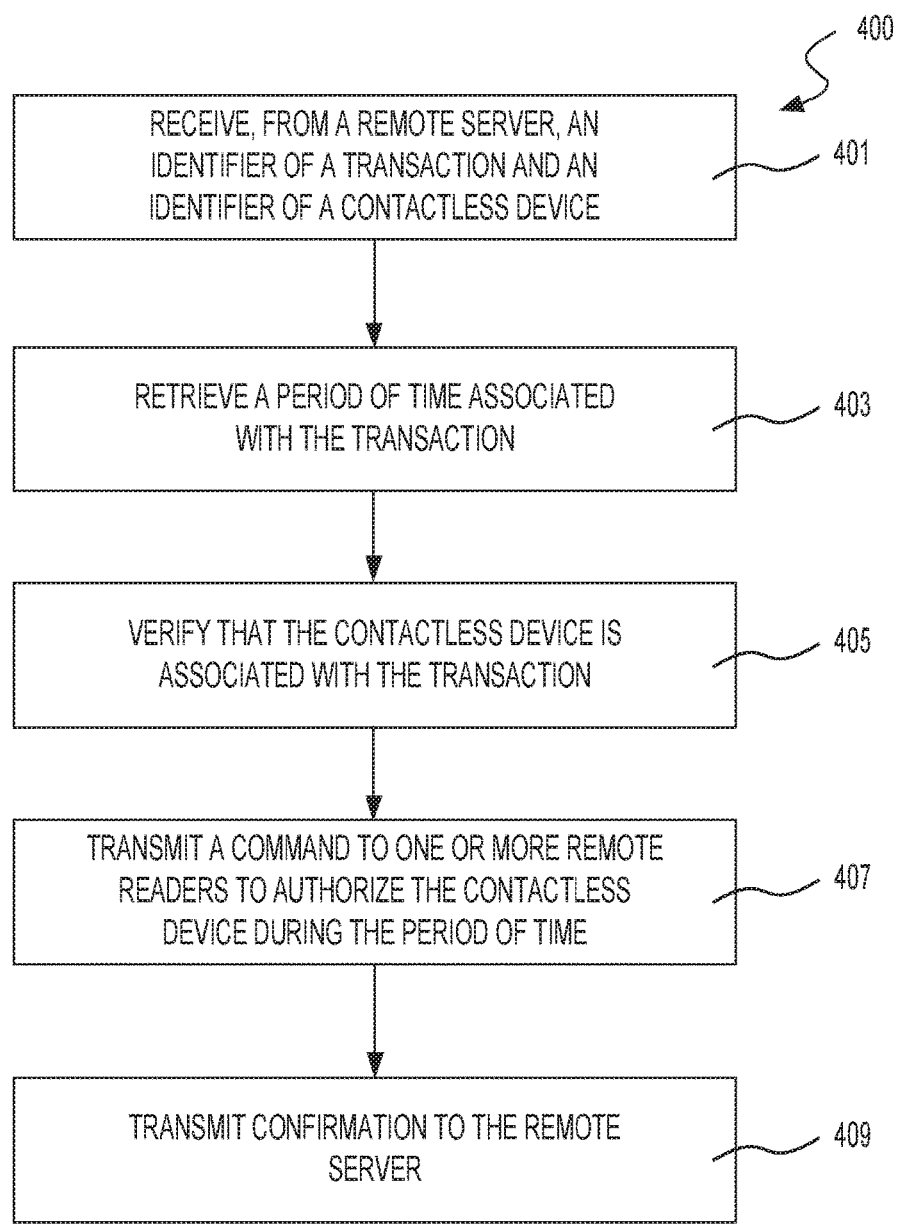
FIG. 4 is a flowchart of another example method for multicomputer data transferring to activate a contactless card, according to an example embodiment of the present disclosure.

FIG. 4 depicts an example method 400 for using multi-computer data transferring to activate a contactless device. Method 400 may be implemented using one or more processors (e.g., processor 601 of FIG. 6). Method 400 may represent a method corresponding to method 300, described above. For example, method 300 may be executed by one server and method 400 executed by another server to perform a multicomputer data transfer to activate a contactless device.

At step 401, the processor may receive, from a remote server (e.g., account server 107 of FIG. 1), an identifier of a transaction and an identifier of a contactless device (e.g., contactless device 103 of FIG. 1). For example, the processor may receive data packet 221 of FIG. 2, explained above.

At step 403, the processor may retrieve a period of time associated with the transaction. For example, the processor may use a transaction ID, a reservation number, or other identifier included in the transaction identifier to retrieve information related to the transaction from a reservation database. For example, the processor may access a hotel reservation having a reservation period associated therewith, an airline reservation having a boarding time associated therewith, or the like.

At step 405, the processor may verify that the contactless device is associated with the transaction. For example, the processor may determine whether a name associated with the contactless device matches a name listed on the transaction (or included in the reservation associated with the transaction).

At step 407, the processor may transmit a command to one or more remote readers to authorize the contactless device during the period of time. For example, the command may comprise an API call to an application executed by the one or more remote readers to authorize the contactless device. Additionally or alternatively, the command may include an identifier of the contactless device, an access code, or the like, such that the one or more remote readers may verify the identity of the contactless device.

At step 409, the processor may transmit confirmation to the remote server. For example, the confirmation may comprise confirmation that the contactless device is authorized.

Method 400 may further include additional steps. For example, method 400 may include a transmitting request for credentials to the remote server (e.g., account server 107 of FIG. 1) and, in response to the request, receiving credentials from the remote server to authenticate the remote server. In some embodiments, the processor may perform verification and transmit the command only after the remote server is authenticated.

In any of the embodiments described above, the processor may transmit the access code to the contactless device or to the remote server for forwarding to the contactless device. Accordingly, the command may configure the one or more readers such that, when the contactless device transmits the access code, the one or more readers may verify the contactless device during the period of time.

Figure 5:
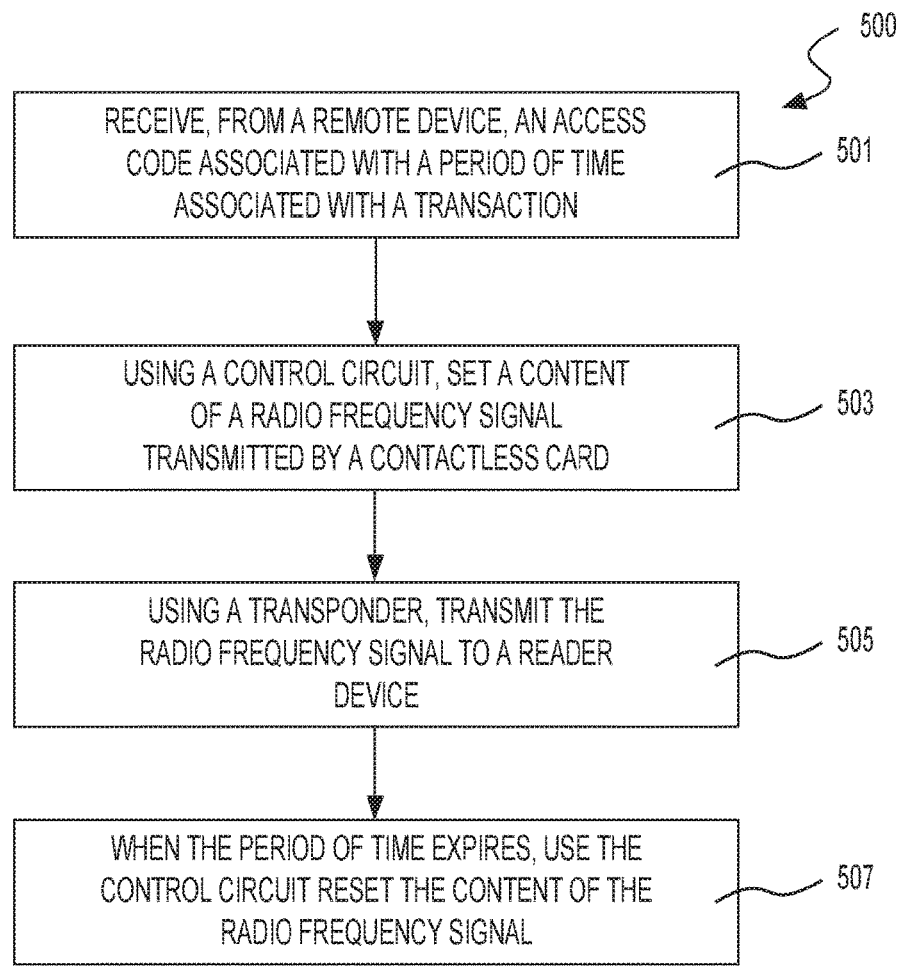
FIG. 5 is a flowchart of an example method for modifying a contactless device to authorize the device, according to an example embodiment of the present disclosure.

FIG. 5 depicts an example method 500 for activating a contactless device. Method 500 may be implemented using a contactless device (e.g., device 700 of FIGS. 7A and 7B or card 800 of FIG. 8). Method 500 may represent a method corresponding to method 400, described above. For example, method 500 may be executed in response to method 400 being executed by the remote server.

At step 501, using a wireless communicator, the contactless device may receive, from a remote device, an access code associated with a period of time associated with a transaction. For example, the access code may comprise a digital code, and the contactless device may encode the digital code as intensity and timing of a radio frequency signal. Alternatively, the access code may have been previously encoded as intensity and timing of a radio frequency signal before receipt by the wireless communicator.

As explained above, the access code may authorize the contactless device to a contactless reader for the period of time. The contactless reader may be in a contactless network operated by a merchant of the transaction.

At step 503, using a control circuit, the contactless device may set a content of a radio frequency signal transmitted by a contactless card. For example, the control circuit may set intensity and timing of the radio frequency signal based on the access code. Additionally or alternatively, the control circuit may set the content using existing radio frequency standards, such as RFID, NFC, or the like. As explained below with respect to FIG. 8, the control circuit may comprise a clock circuit, a microprocessor, or other circuit controlling properties of the radio frequency signal.

At step 505, using a transponder, the contactless device may transmit the radio frequency signal to a reader device. For example, the radio frequency signal may have the intensity and timing previously set by the control device.

At step 507, when the period of time expires, the contactless device may use the control circuit to reset the content of the radio frequency signal. Additionally or alternatively, the access code may be associated with a number of uses, and step 507 may be executed after the number of uses have been met. In some embodiments, step 507 may be omitted such that the contactless card is not modified until another control signal is received to set the intensity and timing of the radio frequency signal.

Figure 6:
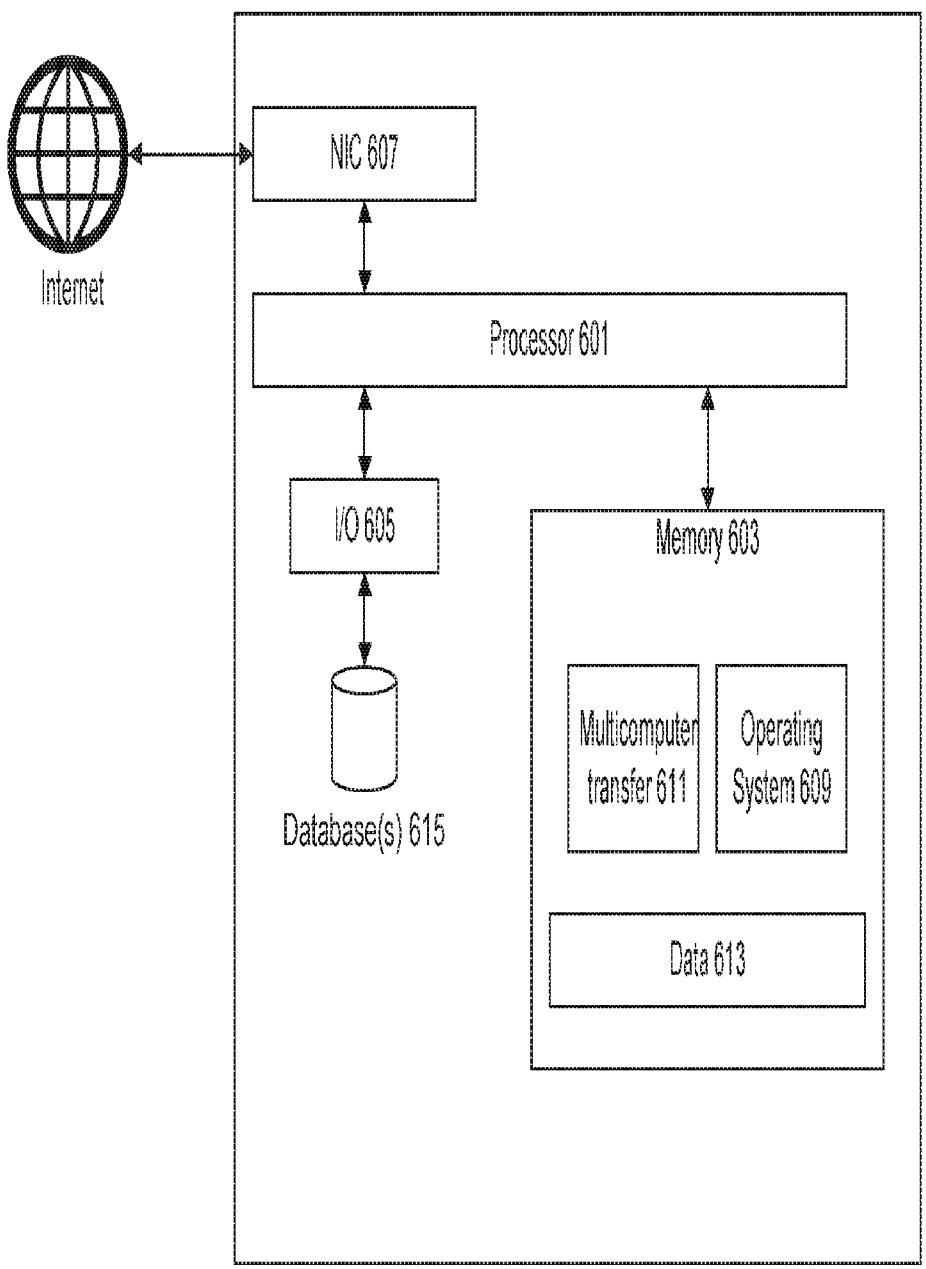
FIG. 6 is a block diagram of an example server with which the systems, methods, and apparatuses of the present disclosure may be implemented.

FIG. 6 is block diagram of an example device 600 suitable for implementing the disclosed systems and methods. For example, device 600 may comprise a server that executes method 300 of FIG. 3 and/or method 400 of FIG. 4.

As depicted in FIG. 6, server 600 may have a processor 601. Processor 601 may comprise a single processor or a plurality of processors. For example, processor 601 may comprise a CPU, a GPU, a reconfigurable array (e.g., an FPGA or other ASIC), or the like.

Processor 601 may be in operable connection with a memory 603, an input/output module 605, and a network interface controller (NIC) 607. Memory 603 may comprise a single memory or a plurality of memories. In addition, memory 603 may comprise volatile memory, non-volatile memory, or a combination thereof. As depicted in FIG. 6, memory 603 may store one or more operating systems 609 and program instructions for multicomputer transferring 611. For example, instructions 611 may cause server 600 to execute method 300 of FIG. 3 and/or method 400 of FIG. 4. In addition, memory 603 may store data 613 produced by, associated with, or otherwise unrelated to operating system 609 and/or instructions for multicomputer transferring 611.

Input/output module 605 may store and retrieve data from one or more databases 615. For example, database(s) 615 may include a database storing merchant identifiers with corresponding identifiers of remote servers operated by merchants.

NIC 607 may connect server 600 to one or more computer networks. In the example of FIG. 6, NIC 607 connects server 600 to the Internet. Server 600 may receive data and instructions over a network using NIC 607 and may transmit data and instructions over a network using NIC 607.

Each of the above identified instructions and applications may correspond to a set of instructions for performing one or more functions described above. These instructions need not be implemented as separate software programs, procedures, or modules. Disclosed memories may include additional instructions or fewer instructions. Furthermore, server 600 may execute method 300 of FIG. 3 and/or method 400 of FIG. 4. These functions of the user device and/or server 600 may be implemented in hardware and/or in software, including in one or more signal processing and/or application specific integrated circuits.

FIG. 7A is a depiction of exemplary user device 700 for use as a contactless device. As depicted in FIG. 7A, device 700 may comprise a smartphone. Device 700 may have a screen 701. For example, screen 701 may display one or more GUIs that allow a user to enter input activating contactless communication. In certain aspects, screen 701 may comprise a touchscreen to facilitate use of the one or more GUIs.

As further depicted in FIG. 7A, device 700 may have one or more buttons, e.g., buttons 703a and 703b. For example, buttons 703a and 703b may facilitate use of one or more GUIs displayed on screen 701.

FIG. 7B is a side view of device 700 of FIG. 7A. As depicted in FIG. 7B, device 700 may have at least one processor 705. For example, at least one processor 705 may comprise a system-on-a-chip (SOC) adapted for use in a portable device, such as device 700. Alternatively or concurrently, at least one processor 705 may comprise any other type(s) of processor.

As further depicted in FIG. 7B, device 700 may have one or more memories, e.g., memories 707a and 707b. In certain aspects, some of the one or more memories, e.g., memory 707a, may comprise a volatile memory. In such aspects, memory 707a, for example, may store one or more applications (or "apps") for execution on at least one processor 705. For example, an app may include an operating system for device 700 and/or an app for executing method 500 of FIG. 5. In addition, memory 707a may store data generated by, associated with, or otherwise unrelated to an app in memory 707a.

Alternatively or concurrently, some of the one or more memories, e.g., memory 707b, may comprise a non-volatile memory. In such aspects, memory 707b, for example, may store one or more applications (or "apps") for execution on at least one processor 705. For example, as discussed above, an app may include an operating system for device 700 and/or an app for executing method 500 of FIG. 5. In addition, memory 707b may store data generated by, associated with, or otherwise unrelated to an app in memory 707b. Furthermore, memory 707b may include a pagefile, swap partition, or other allocation of storage to allow for the use of memory 707b as a substitute for a volatile memory if, for example, memory 707a is full or nearing capacity.

As further depicted in FIG. 7B, device 700 may include at least one coil 709. Coil 709 may be used for contactless communication, e.g., RFID, NFC, or the like. Although not depicted in FIG. 7B, device 700 may further include a wireless communicator for connecting device 700 to one or more computer networks. For example, device 700 may receive data and instructions over a network using an NIC and may transmit data and instructions over a network using the NIC.

Although depicted as a smart phone, device 700 may alternatively comprise a tablet or other computing device having similar components.

Figure 8:
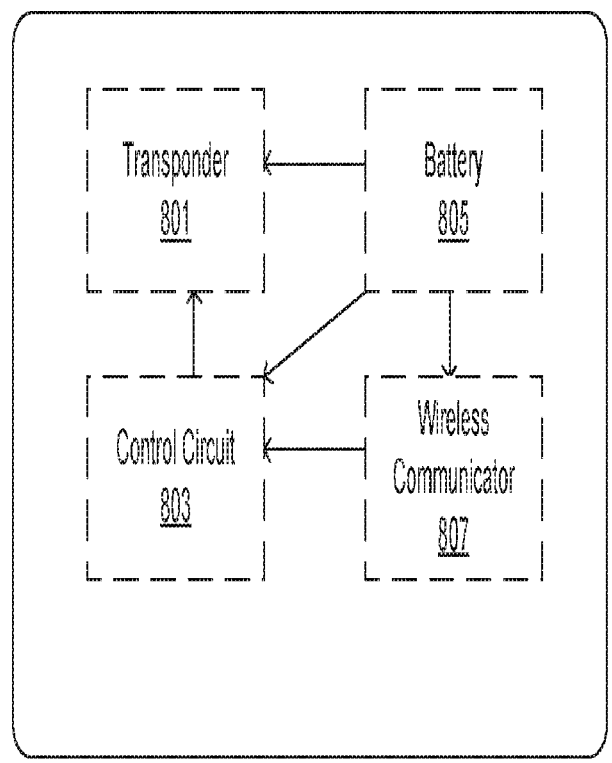
FIG. 8 is a block diagram of an example contactless card with which the systems, methods, and apparatuses of the present disclosure may be implemented.

FIG. 8 is depiction of exemplary contactless card 800 authorized by multicomputer data transferring. As depicted in FIG. 8, device 800 may include a transponder 801, a control circuit 803, and a wireless communicator 807. In some embodiments, device 800 may include a battery 805 to power transponder 801, control circuit 803, and wireless communicator 807. Alternatively, transponder 801 and control circuit 803 may be powered by an incoming radio frequency signal and/or wireless communicator 807 and control circuit 803 may be powered by an incoming control signal.

As further depicted in FIG. 8, control circuit 803 may comprise a microprocessor or any other circuit controlling the content transmitted by transponder 801. For example, control circuit 803 may control timing, intensity, or other properties of a radio frequency signal transmitted by transponder 801. Additionally or alternatively, control circuit 803 may set the content using existing radio frequency standards, such as RFID, NFC, or the like. Control circuit 803 may comprise a clock circuit or other circuit controlling such properties. Control circuit 803 may control one or more properties of the radio frequency signal based on a control signal received by wireless communicator 807. For example, a mobile device and/or reader device may execute method 500 of FIG. 5 and transmit a corresponding control signal to adjust the content transmitted by transponder 801.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for using multicomputer data transferring to activate a contactless user device, the system comprising:
a first server associated with the contactless user device, the first server being in data communication with a second server, and
the second server associated with a reader device, the second server being in data communication with the first server;
wherein the first server is configured to perform operations comprising:
receiving a transaction initiated by the user contactless device, wherein the transaction corresponds to an access request,
retrieving, in response to the transaction, an identifier of the second server from a merchant database, based on the transaction,
assembling a data packet comprising an identifier of the user contactless device and a transaction identifier associated with the transaction, and
transmitting the data packet, via an application programming interface (API) call, to the second server,
wherein the second server, in response to receiving, via the API call, the data packet, is configured to perform operations comprising:
retrieving an identifier of the reader device from a reader database based on the received data packet,
generating an authorization response comprising a reader access code associated with the reader device and the identifier of the user contactless device,
transmitting the authorization response to the reader device based on the retrieved identifier of the reader device, and
transmitting the reader access code to the first server,
wherein the first server, upon receiving the authorization response, is configured to perform further operations comprising:
transmitting the reader access code to the user contactless device, wherein the user contactless device transmits the reader access code to the reader device to authorize the access request associated with the transaction.

2. The system of claim 1, wherein:
the operations performed by the first server further comprise transmitting credentials to the second server, wherein the credentials comprise credential information associated with a purchaser of the transaction.

3. The system of claim 2, wherein the credentials comprise an authorization previously provided from the second server.

4. The system of claim 2, wherein the operations performed by the first server further comprise receiving a request for the credentials from the second server.

5. The system of claim 1, wherein the reader access code, included in the authorization response from the second server is retrieved from a reader database, wherein the reader database stores a plurality of reader access codes associated with a plurality of reader devices disposed at one or more locations.

6. The system of claim 1, wherein the merchant database stores locations of one or more servers associated with one or more merchants.

7. The system of claim 1, wherein the user contactless device corresponds to a contactless card, and wherein the system further comprises:
the contactless card comprises:
a transponder configured for near field communication;
a wireless communicator; and
a control circuit comprising a microprocessor, wherein the control circuit is in data communication with the transponder and the wireless communicator.

8. The system of claim 7, wherein the contactless card further comprises a battery configured to provide power to the transponder, the control circuit, and the wireless communicator.

9. The system of claim 1, wherein operations performed by the first processor further comprise:
receiving an encryption key from a previously exchanged key between the first server, and
encrypting the data packet using the encryption key.

10. The system of claim 9, wherein the encryption key is received from a key distribution center.

11. A method for activating a contactless card with merchant-provided access codes, the method comprising:
receiving, by a first server, a transaction initiated by the contactless card, wherein the transaction corresponds to an access request;
retrieving, by the first server responsive to the transaction, an identifier of a second server from a merchant database based on the transaction, wherein the second server stores the one or more merchant-provided access codes;
assembling, by the first server, a data packet comprising an identifier of the contactless card, and a transaction identifier associated with the transaction;
transmitting the data packet, by the first server via an application programming interface (API) call, to the second server;
in response to receiving, by the second server via the API call, the data packet:
retrieving, by the second server, an identifier of a reader device from a reader database based on the received data packet;
generating, by the second server, an authorization response, wherein the authorization response comprises a reader access code, and the identifier of the contactless card, wherein the reader access code is one of the merchant-provided access codes;
transmitting, by the second server, the authorization response to the reader device based on the retrieved identifier of the reader device;
transmitting, by the second server, the reader access code to the first server; and
upon receiving the reader access code, transmitting, by the first server, the reader access code to the contactless card, wherein the contactless card transmits the reader access code to the reader device to authorize the access request associated with the transaction.

12. The method of claim 11, wherein the reader access code is associated with a predetermined period of time.

13. The method of claim 11, wherein the reader access code is associated with the identifier of the reader device.

14. The method of claim 13, wherein the reader access code is further associated with a predetermined period of time.

15. The method of claim 11, wherein the identifier of the contactless card comprises at least one of a serial number of the contactless card, a serial number of a component of the contactless card, or a universally unique identifier (UUID) associated with the contactless card.

16. The method of claim 12, wherein the reader access code is associated with a predetermined number of transmissions.

17. A system, comprising:
a contactless card, comprising:
a transponder configured for near field communication;
a wireless communicator;
a control circuit comprising a microprocessor, wherein the control circuit is in data communication with the transponder and the wireless communicator; and
a first server comprising a first processor, a first memory, and a first network controller; and
a second server comprising a second processor, a second memory, and a second network controller, wherein second server is in data communication with the first server;
a merchant database in data communication with the first server, wherein the merchant database stores locations of one or more servers associated with one or more merchants; and
a reader database in data communication with the second server, wherein the reader database stores one or more transaction properties associated with one or more locations of reader devices,
wherein, the first memory storing instructions that, when executed by the first processor, cause the first processor to perform operations comprising:
receiving a transaction initiated by the contactless card, the transaction corresponding to an access request,
in responsive to the transaction, retrieve an identifier of the second server from the merchant database,
assembling a data packet comprising an identifier of the contactless card, and a transaction identifier, and
transmitting, via an application programming interface (API) call, the data packet to the second server,
wherein, the second memory storing instructions that, when executed by the second processor, cause the second processor to perform operations comprising:
receiving, via the API call, the data packet,
responsive to receiving the data packet, retrieving an identifier of a reader device, associated with the access request, from the reader database,
generating an authorization response comprising a reader access code associated with the reader device, and the identifier of the contactless card,
transmitting the authorization response to the reader device based on the retrieved identifier of the reader device, and
transmitting the reader access code to the first server,
wherein the first memory stores instructions that, when executed by the first processor, cause and first processor to perform further operations comprising:
upon receiving the reader access code, transmitting the reader access code to the contactless card via an intermediary user device, wherein the intermediary user device communicates via data connectivity with the first server and a short-range wireless connectivity with the contactless card.

18. The system of claim 17, wherein, the contactless card further comprises a third memory storing instructions that, when executed by the microprocessor, cause the microprocessor to perform operations comprising transmitting the reader access code to the reader device.

19. The system of claim 18, wherein the system further comprises the reader device, wherein the reader device is configured to compare the reader access code received from the contactless card, with data in the authorization response received from the second server, and validate the access request based on a matching outcome.

20. The system of claim 17, wherein the contactless card further comprises a battery configured to provide power to the transponder, the control circuit, and the wireless communicator.

* * * * *